(12) United States Patent
Decker et al.

(10) Patent No.: US 6,300,939 B1
(45) Date of Patent: Oct. 9, 2001

(54) INPUT DEVICE

(75) Inventors: Peter Decker, Marl; Thomas Fuhrmann, Buldern, both of (DE)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/175,632

(22) Filed: Oct. 20, 1998

(30) Foreign Application Priority Data

Oct. 23, 1997 (GB) .................................................. 9722456

(51) Int. Cl.$^7$ ...................................................... G09G 5/08
(52) U.S. Cl. ............................................................ 345/157
(58) Field of Search .................................... 345/157, 161, 345/163, 167, 168, 169, 156

(56) References Cited

U.S. PATENT DOCUMENTS

| 4,616,224 | * | 10/1986 | Reighard | 340/825.69 |
| 4,712,101 | | 12/1987 | Culver | 340/710 |
| 4,799,049 | | 1/1989 | Avila | 340/709 |
| 4,823,634 | * | 4/1989 | Culver | 74/471 XY |
| 4,896,554 | * | 1/1990 | Culver | 74/471 XY |
| 4,928,093 | * | 5/1990 | Rahman | 345/471 XY |
| 4,982,618 | * | 1/1991 | Culver | 74/471 XY |
| 5,086,510 | * | 2/1992 | Guenther et al. | 455/90 |
| 5,138,329 | | 8/1992 | Saarnimo et al. | 343/702 |
| 5,168,982 | | 12/1992 | Hakanen et al. | 200/342 |
| 5,319,803 | * | 6/1994 | Allen | 455/566 |
| 5,481,265 | * | 1/1996 | Russell | 341/22 |
| 5,585,785 | * | 12/1996 | Gwin et al. | 340/575 |
| 5,666,138 | * | 9/1997 | Culver | 345/157 |
| 5,850,213 | * | 12/1998 | Imai et al. | 345/167 |
| 6,025,832 | * | 2/2000 | Sudo et al. | 345/158 |

FOREIGN PATENT DOCUMENTS

| 3636080 | * | 4/1988 | (DE) . |
| 38 42 414 A1 | | 6/1990 | (DE) . |
| 2 260 598 A | | 4/1993 | (GB) . |
| 2 308 876 A | | 7/1997 | (GB) . |
| WO 92/06860 | | 4/1992 | (WO) . |

OTHER PUBLICATIONS

Abstracted–Pub–No: RD 328018 A (Jul. 20, 1991).*
United Kingdom Search Report.

* cited by examiner

Primary Examiner—Bipin Shalwala
Assistant Examiner—Ricardo Osorio
(74) Attorney, Agent, or Firm—Perman & Green, LLP

(57) ABSTRACT

The present invention discloses an input device for providing data input comprising a moveable element, the moveable element is capable of rotating about an axis of rotation and displacement orthogonal to the direction of rotational movement, means for detecting said rotation and means for detecting said orthogonal displacement and means for translating said rotation and said orthogonal displacement into signals indicative of respective data inputs.

17 Claims, 5 Drawing Sheets

INPUT DEVICE

BACKGROUND OF THE INVENTION

The present invention is generally related to an input device which enables the control of one or more devices with which a vehicle is equipped in a secure and comfortable way for the driver of the vehicle.

Today vehicles, especially cars and trucks, are more and more equipped with electrical components like car radios, telephones, navigation systems and others. Each of these pieces of car equipment have their own input devices. Besides the control of these pieces of car equipment a lot of devices of the car can be controlled by the driver with other keys, buttons and levers for example electrically controlled back mirrors, windscreen wipers, electrical controllable seat positions and others.

Drivers today have difficulty in finding and using the different pieces of car equipment because of this wide variety of different input and control devices. It is a difficult task for the driver to know all keys and buttons of the equipment and to select the functions of these pieces of equipment. Sometimes drivers get into dangerous traffic situations because they have to concentrate more on operating a huge number of keys and buttons than concentrating on the traffic situation.

The DE patent application DE 3842414 discloses a device for vehicles which integrates the control of a variety of electrical equipment installed in the motor vehicle which the driver may want to activate. This device comprises a visual display monitor which is connected not only to the engine and vehicle instrumentation but also with this variety of aforementioned electrical equipment. The picture screen of the monitor is subdivided into several regions and all the functions that would otherwise be performed by individual buttons, knobs and switches can be performed by a ball control for directing a cursor on the screen of the monitor which can be located on the steering wheel. While a particular piece of equipment selected is being controlled, the corresponding field of the monitor selected by the cursor has its light to dark contrast reversed, to indicate that the corresponding equipment is in the process of being adjusted.

A roller ball, which is integrated into the steering wheel of the car, is near to the hand of the driver but this solution has the disadvantage that the driver, who wants to operate the equipment of the vehicle, has to remove his hand or at least his fingers partly from the hand grip of the steering wheel to reach the ball control.

Furthermore the driver has to rotate the steering wheel to an upward position together with the roller ball input device when the vehicle is for example in a parking position to operate the ball control in a comfortable way. Bringing the steering wheel to an upward position is a rather difficult task when the vehicle is in a parking position, furthermore maybe the steering wheel lock has to be opened before the steering wheel can be turned to the upward position. Anyhow the parking position is as a rule the best position to control devices of the car because the driver does not have to concentrate on the traffic situation.

SUMMARY OF THE INVENTION

According to a first aspect of the present invention there is provided an input device for providing data input comprising a moveable element, the moveable element is capable of rotating about an axis of rotation and displacement orthogonal to the direction of rotational movement, means for detecting said rotation, means for detecting said orthogonal displacement, and means for translating said rotation and said orthogonal displacement into signals indicative of respective data inputs.

The present invention provides an input and control device for vehicle equipment which alleviates at least some of the disadvantages described above.

The input device is preferably built in the shape of a ring. This ring can be rotated about the axis of rotation and said ring like element can be displaced orthogonal to the direction of the rotational movement of the ring.

The displacement orthogonal to the direction of the rotational movement can also be a rotation of this ring.

The rotational movements can be translated into signals indicative of respective data inputs by infrared sensor systems which are for example well known to translate the movements of a computer mouse into electrical signals to control functions of a computer.

The displacement of the ring like element orthogonal to the direction of rotational movement of the ring element can also be detected by pushbuttons which are mounted below the ring. When the ring is rotated orthogonal to the direction of rotational movement and the ring has a half circle cross section, one or more of several pushbuttons which are mounted below the plain area of the ring are closed and they provide a signal which indicates that a displacement of the ring orthogonal to the direction of rotational movement takes place. To distinguish between displacement in two directions also two circles with pushbuttons below the ring are necessary. If the ring is rotated in one direction, one of the pushbutton circle is actuated and for rotation in the other direction, the other pushbutton circle is actuated.

The input device is preferably installed in the steering wheel of a vehicle. It can, for example, be mounted on the centre part of the steering wheel. If this location is not applicable because eg the centre part is occupied by the driver airbag the input device can also be mounted around the inner part of the steering wheel.

It is also advantageous to install the input device on the handgrip of the steering wheel. The diameter of the input device is then the same as the diameter of the handgrip of the steering wheel and can be simply operated by the driver without removing his hand from the steering wheel. It is possible for the driver to leave his hands in the optimal driving position while operating the input device with this kind of construction.

If the input device is placed on the steering wheel of a vehicle the axes of rotation of the steering wheel and of the input device are parallel and the relative displacement between the rotational movement of the input device and the steering wheel is translated into signals indicative of the respective data inputs. This leads to the advantage that a rotation of the steering wheel together with the input device does not have any effect on the output signal of the input device and the input device can be used independently of the position of the steering wheel.

The description above shows that the axes of rotation of the input device and the steering wheel should be parallel to measure the relative movement between the steering wheel and the input device. It is advantageous if the axes are also congruent, this means that the input device is mounted in the middle of the steering wheel, on the steering wheel with a smaller diameter then the steering wheel or on the handgrip of the steering wheel as mentioned above.

Because of the rotational movement and the displacement orthogonal to the direction of rotational movement of the input device which are translated into signals indicative of respective data inputs it is advantageous to represent these movements on a display which is connected with the input device. This means that a cursor which can be used to make selections on a display may be moved based on polar co-ordinates. A rotational movement of the input device causes also a rotational movement on a circle of the cursor and if a displacement of the moveable element is sensed then the radius of the circle of the cursor describes becomes larger or smaller.

The rotational movement of the moveable element may be translated 1 to 1 to the rotation of the cursor on the display. To avoid large movements of the moveable element if the cursor has to be circled eg around 180 degrees it can be useful to expand the movement of the cursor in that way that the moveable element has only to be circled e.g. 45 degrees to have a 180 degree movement of the cursor on the display.

If the input device is equipped with a pushbutton system below the ring, as described above, to sense displacements orthogonal to the direction of rotational movement it is possible to use this pushbutton system to select functions on the display. If the moveable element is pressed down at any point of its circumference then one or more pushbuttons on an outer circle and one or more pushbuttons on an inner circle of the input device are closed and a signal will be generated which indicates a selection to a connected system.

According to a second aspect of the present invention there is provided an input device for providing data input comprising a first moveable element capable of rotating about a first axis of rotation and a second moveable element capable of rotating about a second axis of rotation, said first and second axes being parallel, means for detecting said rotation of said first moveable element, means for detecting relative displacement between said first moveable element and said second moveable element, means for translating said rotation of said first moveable element for controlling a first function and means for translating the relative displacement between said first moveable element and said second moveable element for controlling a second function.

According to a third aspect of the present invention there is provided an input device for indicating areas on a screen comprising a moveable element, said moveable element is capable of movement into mutually orthogonal directions with means for translating said mutually orthogonal movements into signals indicative of respective polar co-ordinates indicating said areas on a screen.

BRIEF DESCRIPTION OF THE DRAWINGS

The present invention will now be described by way of example, with reference to the accompanying drawings, in which.

DETAILED DESCRIPTION OF THE INVENTION

Figure 1:
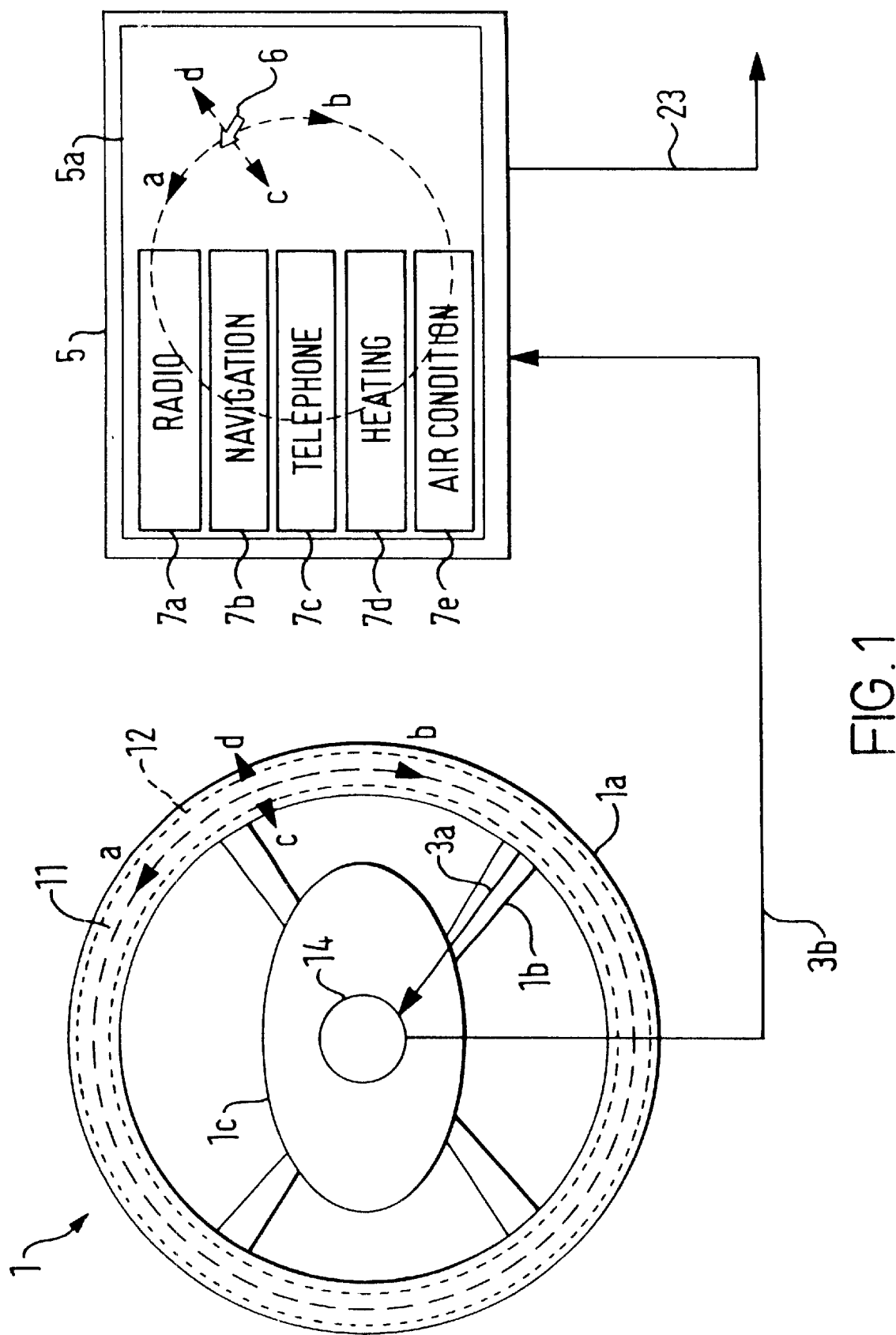
FIG. 1 shows a steering wheel with the present invention connected to a vehicle equipment control unit

FIG. 1 shows the front side of a steering wheel 1 with a hand grip 1a and four spokes 1b and a center part 1c. Furthermore the steering wheel 1 comprises the inventive input device 11 in the hand grip 1a. The input device 11 comprises a ring 12 which is moveable in the directions a and b, and c and d. The movements of the ring are converted to electrical signals as it will be described later on in FIGS. 2 and 3.

The electrical signals from the input device 11 are directed to the rotating contacts 14 via wires 3a and then routed via wires 3b to the vehicle equipment control unit 5. Instead of the rotating contacts 14 which might be difficult to install between the steering wheel and the steering gear because several contacts are necessary also a short range radio interface or an infrared link can be used to connect the input device 11 with the car equipment control unit 5. Only a power supply connection for the input device 11 with two rotating contacts would be necessary in this case.

The car equipment control unit 5 contains a display screen 5a. The display screen shows the vehicle equipment it is connected with via line 23. It can be connected to a variety of car equipment. In this example the unit 5 is connected with a car radio 7a, a navigation system 7b, telephone 7c, heating 7d and air conditioning 7e. The connected car equipment is controlled by the control device 5.

The control device 5 can advantageously be installed in the dashboard of the car and perform also the function of a usual vehicle instrumentation if the driver does not operate any of the vehicle equipment. It can also be installed on the dashboard in line of sight of the driver or in the installation space for a car radio.

Furthermore the equipment control unit 5 and the display screen 5a can be separated and connected with a suitable connection. The display unit 5a may also be a head up display unit which shows the information directly on the windscreen. The equipment which the driver of the vehicle wants to operate can be selected by a cursor 6 on the display screen 5a. The cursor 6 moves in the directions a or b if the ring 12 is moved to the corresponding directions and moves in the directions c and d if the ring 12 is rotated correspondingly.

It may also be possible to shift cursor 6 into a x-direction by rotating ring 12 into direction a and b and move it into a y-direction when rotating ring 12 into directions c and d, but this might be more confusing the user than to move the cursor in polar coordinates as it is described first.

To reduce the amount of rotating ring 12 in the directions a and b for the user it is also possible that cursor 6 rotates for 360 degrees when the ring 12 is rotated less than 360 degrees into direction a or b. A good solution can be to have a 360 degree rotation of cursor 6 when the ring is rotated around 20 degrees. The user can then circle the cursor once around the screen with only a few movements of his finger tips. If the cursor 6 does not reach one of the fields 7a to 7e which the user may want to select he rotates the ring in or out into direction c or d until cursor 6 has reached the field to be selected.

One of the fields 7a to 7e below cursor 6 is selected by pressing down ring 12, the display screen 5a then shows the control menu for the selected car equipment and the user can proceed with controlling the selected car equipment. The input menu for every car equipment may vary from others, therefore this process will not further be described here in detail but variations will be clear to those skilled in the art.

The input device 11 is not necessarily installed on the hand grip of the steering wheel. It is also possible to install device 11 with a diameter smaller than the handgrip of the steering wheel on the centre part 1c of the steering wheel or around the centre part 1c of the steering wheel.

Figure 7:
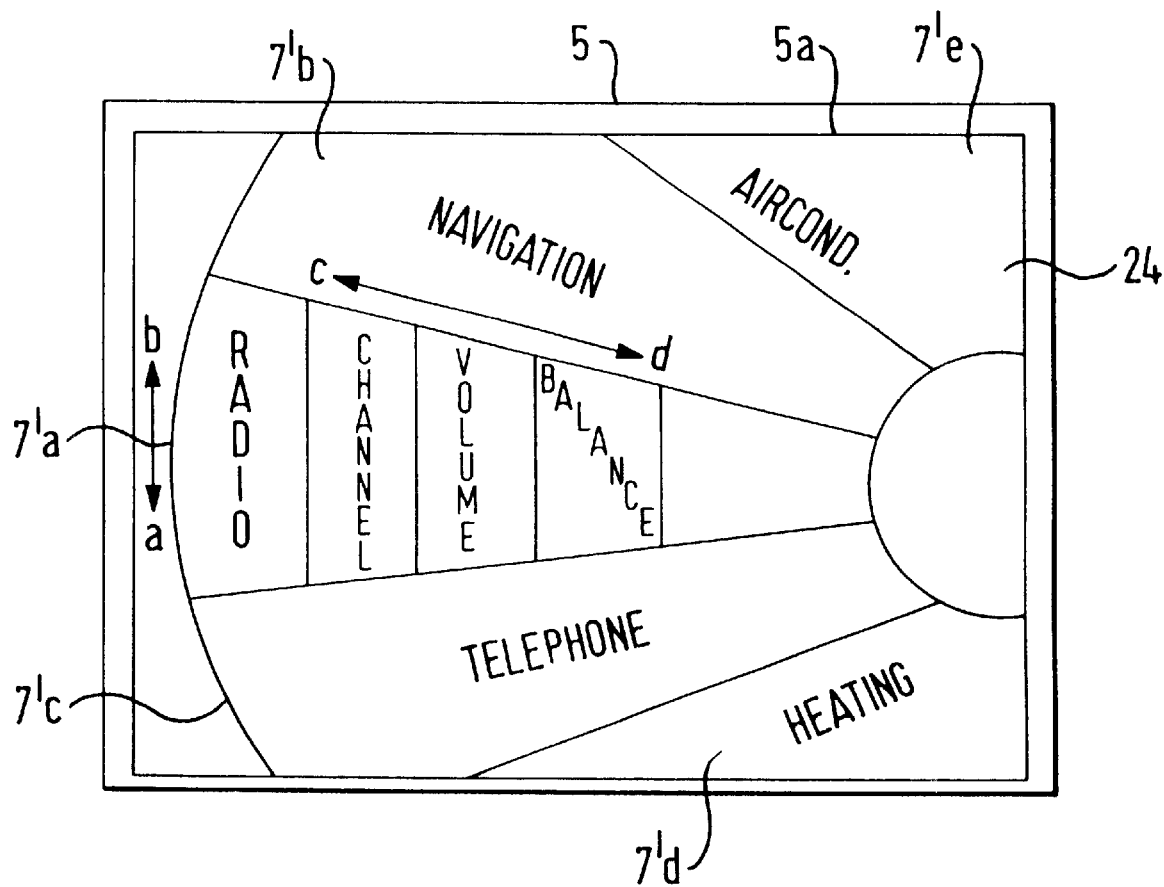
FIG. 7 is a plan view of a display screen indicating various types of car equipment that can be controlled.

FIG. 7 shows another possibility to indicate the rotation in direction a, b and c, d on the display screen 5a. In this embodiment no cursor 6 is moved. Instead of this the menus 7a'–7e' for controlling the corresponding car equipment are placed on a virtual disc 24 which rotates into directions a and b when corresponding movements of ring 11 are made. The menu of the device which is then displayed on the outer most portion of the radius. In this example it is the car radio 7a which can actually be controlled. By moving ring 12 in directions c or d the user can choose the functions to be controlled, the channel, volume or balance in this example.

Figure 2:
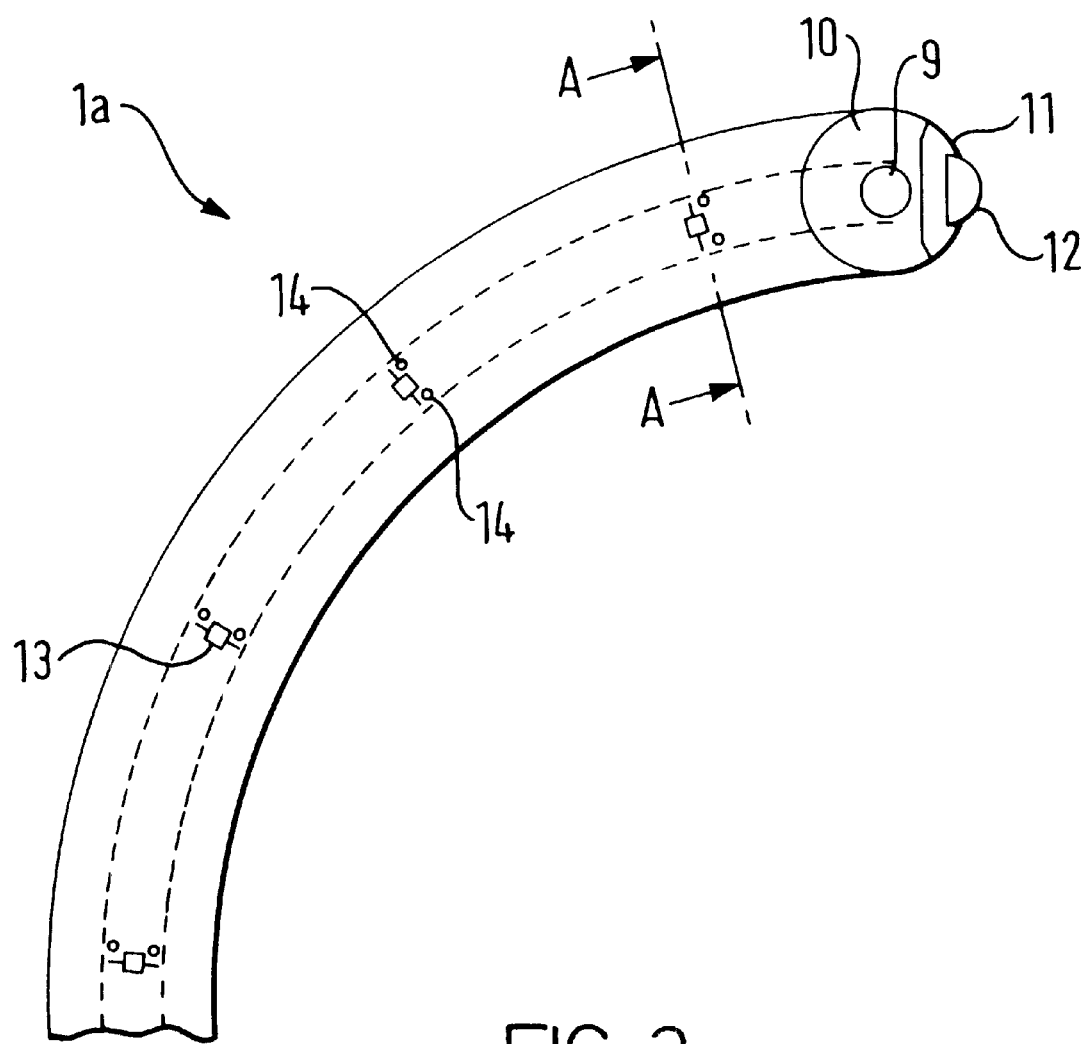
FIG. 2 shows a part of the hand grip of the steering wheel of FIG. 1 with the inventive input device

FIG. 2 shows a more detailed view of a part of the hand grip 1a of the steering wheel 1. The ordinary parts of a steering wheel shown in this figure are a core ring 9 made of steel or any other suitable material which is surrounded by a suitable soft plastic foam 10.

The input device 11 is partly integrated into the back side of the hand grip 1a of the steering wheel and comprises ring 12 which can be moved into directions a, b, c and d by the fingers of the driver. Rollers 13 are installed below the ring 12 to guide ring 12 and facilitate the movements of ring 12. One of the rollers 13 is connected to a sensor 16 for sensing the rotating movement of ring 12.

Below ring 12 there are several pushbuttons 14. At least one of the pushbuttons 14 is closed when ring 12 is moved by the finger in the directions c or d. If the user wants to move the cursor as described in FIG. 1 to the inner section of the display 5a he closes one of the pushbuttons 14 by moving ring 12 into direction c or d. Two neighbouring pushbuttons 14 are closed when ring 12 is pressed down.

The pushbutton system 14 can also be constructed in a way that the outer pushbuttons 14 are connected to an outer ring and all inner pushputtons 14 are connected to an inner ring below ring 12.

Figure 3:
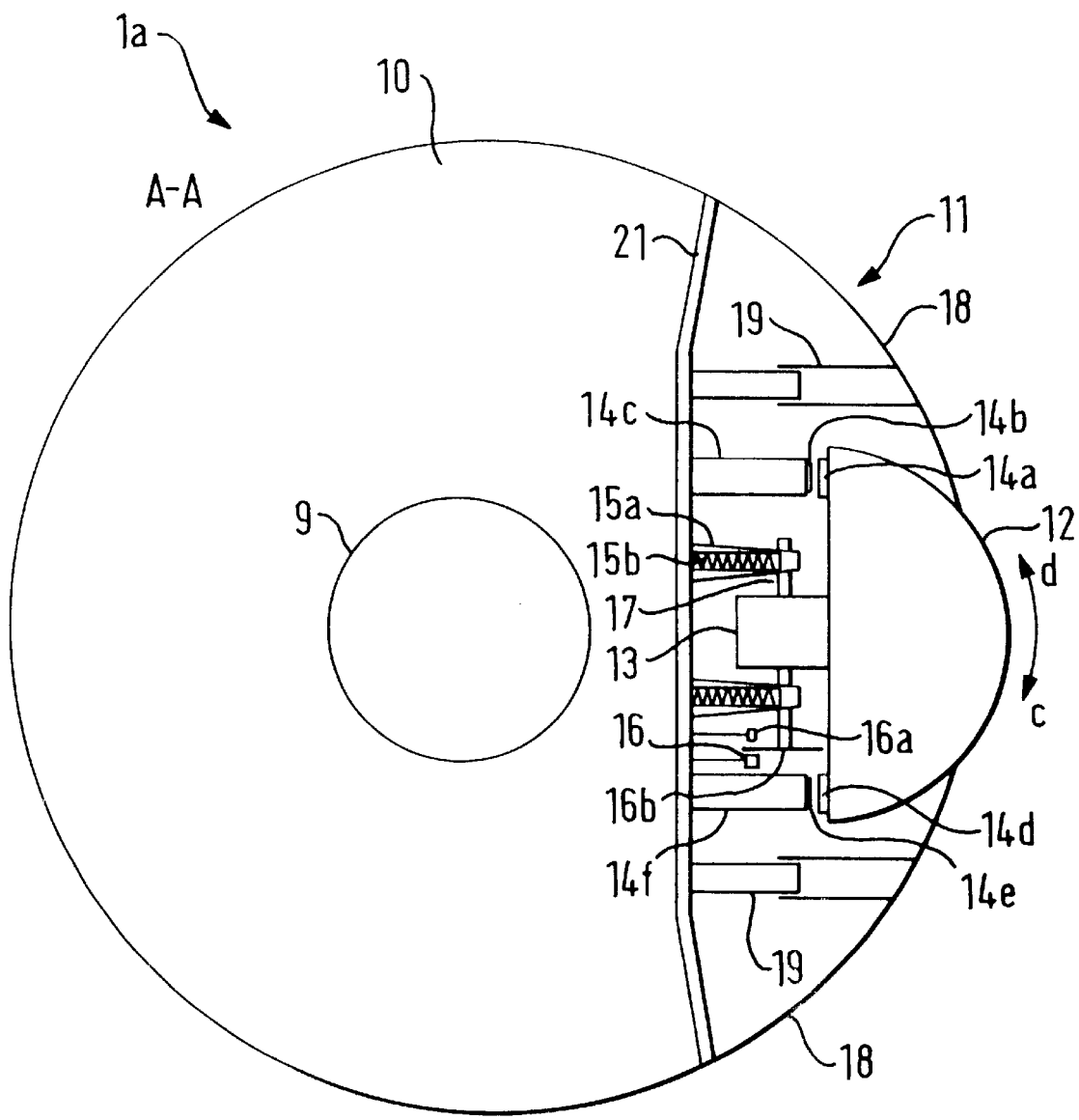
FIG. 3 shows a detailed cross section view A—A of the hand grip of the steering wheel with a detailed view of the input device components

FIG. 3 shows a detailed cross section view on line A—A of FIG. 2 of the handgrip 1a of the steering wheel 1 with the input device 11.

The hand grip 1a of the steering wheel 1 comprises an opening at its back side and a base plate 21 is fixed into this opening. The components of the input device 11 are assembled on the base plate 21. The usage of base plate 21 simplifies the mounting and the demounting of the input device 11.

The moveable ring 12 is pressed against covers 18 by the power of springs 15a. The springs 15b are within two stands 15a for the roller 13. The springs 15a press shafts 17 of the roller 13 against the ring 12 which is pressed towards the covers 18 this way.

One of the shafts 17 carries a perforated disc 16b which is part of the rotation sensor 16. On the one side of the perforated disc 16b a infrared light emitting diode (LED) 16c is placed and on the other side a infra red light detector 16a is placed. When ring 12 is rotated also the perforated disc 16b rotates and the infra red light detector detects an on/off signal. The conversion of the on/off signal detected by the rotation of the ring 12 to a movement of the cursor 6 on a display screen is known, for example, from personal computers which are equipped with a computer mouse for persons skilled in the art and is not further described here. Only one of the rollers 13 which are placed below ring 12 is connected to the rotation sensor 16 in this embodiment.

Furthermore the pushbutton system 14 is shown in FIG. 3 which comprises the parts 14a, b and c on the upper side and 14d, e and f on the lower side below ring 12. The parts 14a, d are layers of conductive soft plastic material which are known from other types of keyboard. The layers 14a, d are attached to the backside of the ring 12. Printed circuit boards 14b, e are mounted on stands 14c, f. Each of the two circuit boards 14b, e comprises two printed lines which are not connected when the conductive layer 14a, d does not touch the surface of the circuit boards 14b, e. When ring 12 is rotated, or pressed upwards in this figure the conductive layer 14a couples with the printed lines of the printed circuit board 14b and the pushbutton 14a, b, c is closed. This causes a movement of the cursor 6 on the display screen 5a outwards. Movements of the ring 12 in direction c, for example, closes one or more pushbuttons of the push button system 14d, e, f.

When the ring 12 is pressed in the direction of the core 9 of the hand grip 1a of the steering wheel, both pushbutton systems 14a, b, c and 14d, e, f are closed and the vehicle equipment control unit 5 recognises the selection of a field on the display.

Advantageously the printed circuit boards 14b and 14e are build in the shape of a ring which have a little smaller diameter than ring 12 to ensure that the pushbutton system is operable at every position of ring 12. The operation of the pushbutton system is furthermore more secure when also the conductive layers 14a and 14d are ring-like mounted on the backside of the ring 12.

The cover plates 18 are connected to the base plate with suitable connectors 19 and 20. The components of the input device 11 are secured by the covers 18 by this way. Furthermore the covers 18 hold down the ring 12 which is pressed against the cover plates 18 by the power of the springs 15b as described above.

The ring 12 and the cover plates 18 in this embodiment can be made of hard plastic material and can be advantageously plated with Teflon or a similar material to have smooth surfaces which ensures an easy and lithe movement of the ring 12.

The usage of the input device 11 of the described embodiment is independent from the steering position of steering wheel 1. This is an advantage when the vehicle stands in a parking position and the driver wants for example to operate his navigation terminal before he starts driving, even if the steering wheel is not in an upright position.

Figure 4:
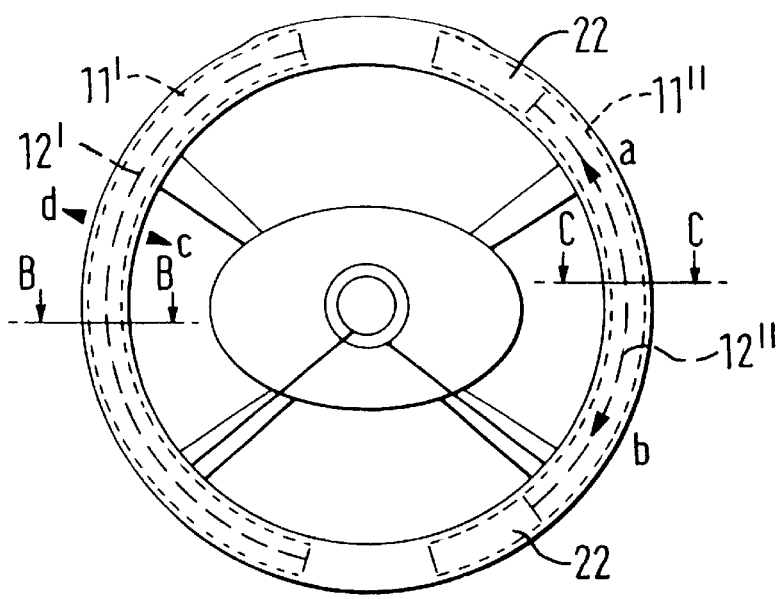
FIG. 4 shows an alternative embodiment of the steering wheel with inventive input device
Figure 5:
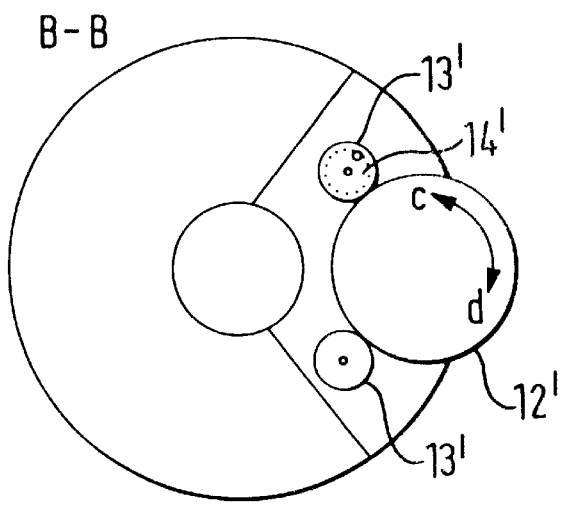
FIG. 5 shows the cross-sectional view B—B of the hand grip of the steering wheel of FIG. 4
Figure 6:
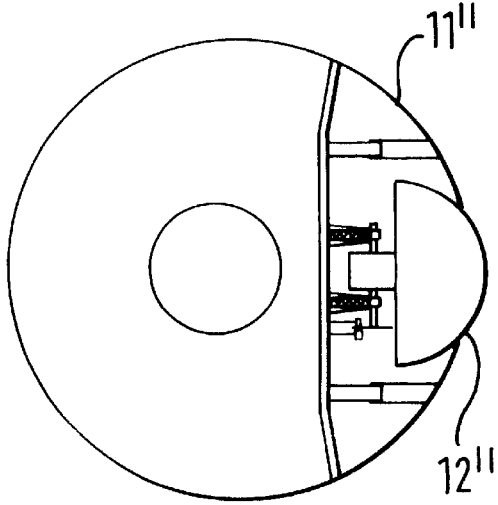
FIG. 6 shows the cross-sectional view C—C of the hand grip of the steering wheel of FIG. 4

FIGS. 4 to 6 show another embodiment of the invention. The input device 11 shown in the FIGS. 1 to 3 is divided into the two parts 11' and 11" comprising the ring sections 12' and 12". Similar components are referenced with the same reference numeral. Parts which are already described above are not further mentioned in the following text, unless their function has changed.

The input device 11' is installed within the left side of the hand grip 1a of the steering wheel of FIG. 4. The ring section 12' consists of soft plastic material or may also be a coil spring. Ring section 12' has a circular cross section and can be rotated orthogonal to the rotation of the steering wheel inwards and outwards in directions c and d. This rotation takes the place of the mechanism of ring 12' (FIG. 2 and FIG. 3, parts 14). Several rollers 13' are installed below ring section 12' to guide it. One of the rollers 13' is connected to a rotation sensor 14' which converts the rotational movement in the directions c and d (see FIG. 1) to electrical signals which are transmitted to the vehicle equipment control unit 5 in the same way as described above. The rotation sensor 14' works in the same way as the rotation sensor 16 (FIGS. 2 and 3).

Within the right side of the hand grip of the steering wheel a second input device 11" is placed. Input device 11" works in the same way as the input device 11 but it is only capable of producing signals indicative of movements in directions a and b.

The ring 12" cannot be moved around the whole hand grip of the steering wheel. To enable movement in the directions a and b free spaces 22 (FIG. 4) are provided to enable the ring section 12" to move. The ring 12" can be moved in the directions a and b this way and the movement is converted to electrical signals which are transmitted to the vehicle equipment control device.

The present invention may include any novel feature or combination of features disclosed herein either explicitly or any generalisation thereof irrespective of whether or not it relates to the presently claimed invention or mitigates any or all of the problems addressed. In view of the foregoing description it will be evident to a person skilled in the art that various modifications may be made within the scope of invention.

What is claimed is:

1. An input device for providing data input for use with a vehicle steering wheel having an axis of rotation, wherein the input device is fixed to the vehicle steering wheel, comprising:

a moveable element capable of axial rotation relative to the vehicle steering wheel, said relative rotation being substantially about said axis of rotation and capable of displacement substantially orthogonal to the direction of rotational movement;

means for detecting relative rotation and displacement of said moveable element; and means for translating said detected rotation and displacement into signals indicative of respective data input.

2. An input device as claimed in claim 1 wherein said moveable element is ring-shaped.

3. An input device as claimed in claim 2 wherein said displacement of said ring-shaped element is a rotation orthogonal to said direction of movement.

4. An input device as claimed in claim 1 said displacement of said ring-shaped element is translated into signals indicative of respective data inputs with sensors.

5. An input device as claimed in claim 4 wherein an infrared sensor system translates the rotational movements into signals indicative of respective data inputs.

6. An input device as claimed in claim 4 wherein a number of pushbuttons are mounted below said ring said pushbuttons being actuated by pressing the hand griply toward one or more of the pushbuttons to translate the orthogonal displacement of said ring into signals indicative of respective data inputs.

7. An input device as claimed in claim 1 wherein said signals cause movement of a cursor on a display.

8. An input device as claimed in claim 1 wherein said moveable element is a first moveable element which is capable of displacement relative to a second moveable element and the axes of rotation of said first and second moveable elements are parallel and the relative displacement between said first moveable element and said second moveable element is translated into one of the signals indicative of said respective data input.

9. An input device as claimed in claim 8 wherein the axes of rotation of said first and second moveable elements are congruent.

10. An input device as claimed in claim 1 wherein the mutually orthogonal movements of said first moveable element are translated into signals indicative of movement in polar co-ordinates.

11. An input device as claimed in claim 1 said device is placed on the handgrip of said vehicle steering wheel.

12. An input device as claimed in claim 1 wherein functions can be selected by pressing said first moveable element.

13. An input device for providing data input for use with a vehicle steering wheel having an axis of rotation, wherein the input device is fixed to the vehicle steering wheel, comprising:

a first moveable element capable of rotating about a first axis of rotation of the vehicle steering wheel, and a second moveable element capable of rotating about a second axis of rotation of the vehicle steering wheel, said first and second axes being parallel;

means for detecting said rotation of said first moveable element;

means for detecting relative displacement between said first moveable element and said second element; and means for translating said rotation of said first moveable element for controlling a first function and means for translating the relative displacement between said first moveable element and said second moveable element for controlling a second function.

14. An input device for indicating areas on a screen and for use with a vehicle steering wheel having an axis of rotation, wherein the input device is fixed to the vehicle steering wheel comprising a moveable element, said moveable element is capable of movement into mutually orthogonal directions, with means for translating said mutually orthogonal movements into signals indicative of respective polar co-ordinates indicating said areas on a screen.

15. An input device as claimed in claim 14 wherein a cursor is moved on said screen in accordance with said polar co-ordinates.

16. An input device for providing data input for use with a vehicle steering wheel having an axis of rotation, wherein the input device is fixed to the vehicle steering wheel and for indicating areas on a screen, comprising:

a movable element capable of movement into mutually orthogonal directions, with means for translating said mutually orthogonal movements into signals indicative of respective polar co-ordinates indicating said areas on a screen;

means for detecting relative rotation and displacement of said movable element; and means for translating said detected rotation and displacement into signals indicative of respective data input.

17. An input device for providing data input for use with a vehicle steering wheel having an axis of rotation, wherein the input device is fixed to the vehicle steering wheel and for indicating areas on a screen, comprising:

a ring-shaped movable element capable of movement into mutually orthogonal directions, with means for translating said mutually orthogonal movements into signals indicative of respective polar co-ordinates indicating said areas on a screen;

means for detecting relative rotation and displacement of said movable element; and means for translating said detected rotation and displacement into signals indicative of respective data input.

\* \* \* \* \*

UNITED STATES PATENT AND TRADEMARK OFFICE
CERTIFICATE OF CORRECTION

PATENT NO. : 6,300,939 B1  
DATED : October 9, 2001  
INVENTOR(S) : Decker et al.

Page 1 of 1

It is certified that error appears in the above-identified patent and that said Letters Patent is hereby corrected as shown below:

<u>Column 7,</u>  
Line 34, delete "data input" and insert -- polar coordinates --.

Signed and Sealed this

Seventh Day of May 2002

Attest:

JAMES E. ROGAN  
*Attesting Officer*     *Director of the United States Patent and Trademark Office*